United States Patent [19]

Rozman et al.

[11] Patent Number: 5,016,157

[45] Date of Patent: May 14, 1991

[54] VSCF SYSTEM WITH DC LINK HARMONICS CONTROL

[75] Inventors: Gregory I. Rozman; Vijay K. Maddali, both of Rockford, Ill.

[73] Assignee: Sundstrand Corporation, Rockford, Ill.

[21] Appl. No.: 428,759

[22] Filed: Oct. 30, 1989

[51] Int. Cl.⁵ .............................................. H02M 1/12
[52] U.S. Cl. ...................................... 363/39; 307/105; 318/811; 388/811
[58] Field of Search ........................ 363/37, 39, 41, 97, 363/131, 132; 318/800, 801, 803, 805, 806, 807, 808, 810, 811, 812; 307/105; 388/811

[56] References Cited

U.S. PATENT DOCUMENTS

| | | | |
|---|---|---|---|
| 4,067,057 | 1/1978 | Taddeo et al. | 363/41 |
| 4,382,275 | 5/1983 | Glennon | 363/41 |
| 4,527,226 | 7/1985 | Glennon | 363/41 |
| 4,763,059 | 8/1988 | Espelage et al. | 363/41 X |
| 4,812,669 | 3/1989 | Takeda et al. | 363/132 X |
| 4,906,860 | 3/1990 | Asaeda | 307/105 |

FOREIGN PATENT DOCUMENTS

| | | |
|---|---|---|
| 0266901 | 4/1989 | Fed. Rep. of Germany . |
| 3832922 | 4/1989 | Fed. Rep. of Germany . |
| 00-16065 | 1/1987 | Japan . |
| 0-238455 | 9/1989 | Japan . |
| WO87/04023 | 7/1987 | PCT Int'l Appl. . |

*Primary Examiner*—Steven L. Stephan
*Assistant Examiner*—Emanuel Todd Voeltz
*Attorney, Agent, or Firm*—Wood, Phillips, Mason, Recktenwald & Vansanten

[57] ABSTRACT

The problem of reducing harmonic content of AC bus voltage in a power system (10) is minimized using a controller (30) for a PWM inverter (38). The controller (30) develops a duty cycle command on a line (40) for controlling operation of the PWM inverter (38). The controller (30) develops the duty cycle command to maintain the PWM inverter output voltage at a desired level. This duty cycle command is modulated in accordance with the harmonic content evident on a DC bus (34) which supplies power to the PWM inverter (38).

18 Claims, 2 Drawing Sheets

VSCF SYSTEM WITH DC LINK HARMONICS CONTROL

FIELD OF THE INVENTION

This invention relates to electrical power systems and, more particularly, to a power system for generating power having reduced harmonic content.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil. Owing to the variation in engine speed, the frequency of the power developed in the generator windings is similarly variable. This variable frequency power is converted to constant frequency power using a variable speed constant frequency (VSCF) system including a power converter which may develop, for example, 115/200 $V_{AC}$ power at 400 hz.

Such a converter includes an AC to DC converter, such as a rectifier, connectable through a DC link having a filter to a DC/AC converter, such as an inverter. The output of the inverter comprises constant frequency power which is applied through a high frequency filter to an AC bus. The high frequency filter is used to reduce the higher harmonics. The size and weight of the filter depend upon the level of the higher harmonics. In an aircraft it is desirable to minimize size and weight of components as much as possible.

The present invention is intended to overcome one or more of the problems as set forth above.

SUMMARY OF THE INVENTION

In accordance with the present invention, an inverter is controlled to provide reduced harmonic content of the inverter output voltage.

Broadly, there is disclosed herein an inverter control system for an inverter coupled to a DC bus. The inverter is controlled to provide a select duty cycle to control inverter output voltage. Means are provided for developing a duty cycle command representing a select duty cycle for inverter operation. Means are also provided for sensing harmonic content in the DC bus. Means are coupled to the developing means and the sensing means for modulating the duty cycle command to provide an inverter output voltage having reduced harmonic content.

It is a feature of the invention that the duty cycle command is determined responsive to an inverter output reference representing a desired inverter output voltage and sensed actual inverter output voltage.

It is a further feature of the invention that the duty cycle command is determined responsive to a compensated inverter output voltage error.

It is another feature of the invention that the harmonic content is sensed by separating the harmonic content from the DC link voltage and stripping the AC signal therefrom to provide a signal representing the magnitude of the harmonic content.

It is still another feature of the invention that the control filters out the third harmonic.

More specifically, the disclosed system is used for providing constant frequency power from a variable speed generator. The constant frequency power is developed at a pulse width modulation (PWM) inverter. The inverter is controlled by a controller which provides for reduced harmonic content in the inverter output voltage.

The inverter receives a DC bus voltage from a power source comprising rectified generator output voltage. The DC bus voltage comprises a constant voltage, for example, 270 volts DC, and harmonics. The harmonics are added to the inverter output voltage and must be filtered.

The inverter controller receives a signal representing DC link voltage, and a signal representing inverter output voltage. The controller also receives a signal from the PWM inverter representing electrical phase angle. The controller develops a duty cycle command which is transmitted to the PWM inverter. The PWM inverter is controlled in accordance with the duty cycle command to provide a select inverter output voltage.

The controller includes a closed loop voltage control for controlling inverter output voltage. The actual output voltage is compared to a reference voltage and the difference therebetween is compensated to provide a duty cycle reference. A detecting circuit separates the third harmonic from the DC voltage of the DC link and factors out the alternating position of the third harmonic to provide a quotient representing the level of the third harmonic divided by the DC voltage level. The duty cycle reference is modulated with the quotient to develop the duty cycle the duty cycle by the third harmonic of the DC link voltage cancel or reduce the effect of the third harmonic.

Further features and advantages of this invention will readily be apparent from the specification and from the drawings.

DETAILED DESCRIPTION OF THE PREFERRED EMBODIMENT

Figure 1:
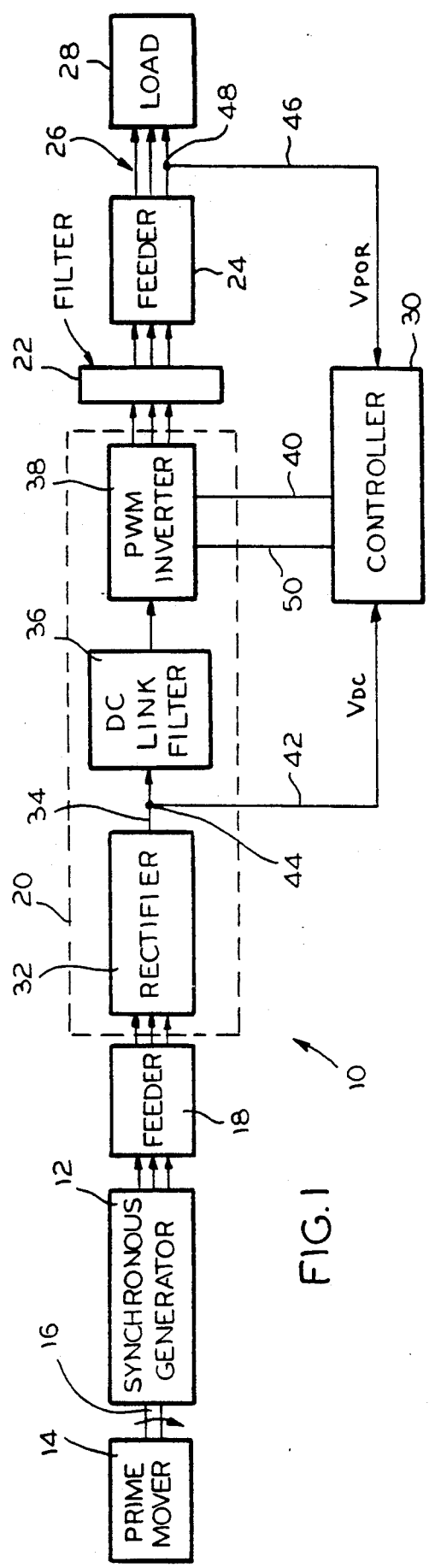
FIG. 1 is a block diagram of an electrical power system including an inverter controller according to the invention.

Referring first to FIG. 1, an electrical power system 10 includes a main generator 12 driven by a prime mover 14 through a shaft 16. Although not shown, an exciter and permanent magnet generator may also be driven by the prime mover 14 through the shaft 16 for providing field power to the synchronous generator 12, if necessary, as is conventional.

In addition to a field winding, the main generator 12 includes a stator, or armature, winding. The armature winding develops polyphase output power which is delivered through a feeder 18 to a converter 20. The converter 20 develops constant frequency power which is coupled through a high frequency filter 22 and output feeder 24 to an AC bus 26 for powering loads, represented typically at 28.

In a typical application, the prime mover 14 is the main engine in an aircraft, and the converter 20 is part of a variable speed constant frequency (VSCF) system for delivering constant frequency power to the AC bus 26 for powering aircraft loads, as controlled by a controller 30.

The converter 20 includes an AC/DC converter 32 connected through a DC link 34 and DC link filter 36 to a DC/AC converter 38. Particularly, according to the illustrated embodiment of the invention, the AC/DC converter 32 comprises a full wave bridge rectifier circuit of conventional construction which is operable to convert three-phase AC power to DC power. The DC/AC converter 38 comprises a pulse width modulation (PWM) inverter circuit.

Figure 2:
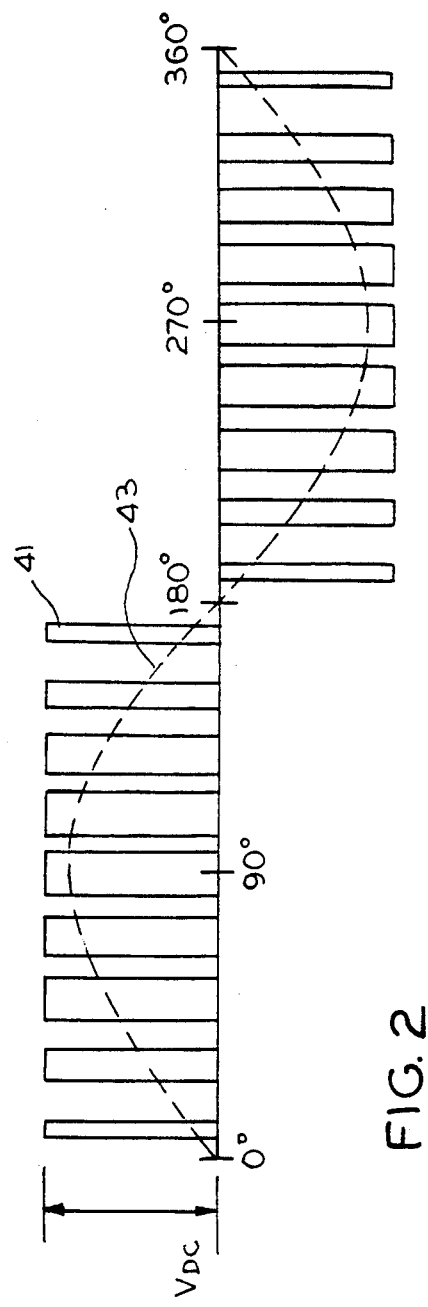
FIG. 2 is a graph illustrating a pulse width modulated wave form.

The structure of the PWM inverter 38 may take one of many known forms. For example, the PWM inverter 38 may comprise a voltage source inverter having six power switches connected in a three-phase bridge configuration. Each of the power switches receive base drive commands from a pulse width modulation generator circuit. Such a PWM generator circuit develops base drive signals to control the output voltage of the PWM inverter 38 by varying the duty cycle of the PWM signals. The duty cycle is proportional to a duty cycle command received on a line 40 from the controller 30. Specifically, the inverter switches are turned on and off in accordance with a pulse width modulated wave form 41, such as shown in FIG. 2, which is applied to the filter 22 which, in response thereto, provides a sin wave output 43, see FIG. 2. The magnitude $V_{DC}$ of the PWM waveform 41 represents the DC supply voltage on the DC link 34. The magnitude of the sin wave output 43 depends upon the DC link voltage and the duty cycle. As is well known, the duty cycle represents the on time of the switches relative to the cycle time.

The controller 30 receives a DC link voltage signal on a line 42 from a DC link voltage sensor 44; a point of regulation voltage signal $V_{POR}$ on a line 46 from a voltage sensor 48 which senses actual voltage on the bus 26; and an electrical phase angle, representing angular position for each pole in a multiple machine, on a line 50 from the PWM inverter 38.

As is well known with generating systems, the point of regulation voltage sensed by the sensor 48 is a function of the duty cycle, as discussed above. Although the DC link voltage $V_{DC}$ is normally represented as a constant, in actuality this voltage includes a DC level of, for example, 270 volts, plus harmonics. The most significant harmonic is the third harmonic which is represented by the equation $V_3\sin(3\omega t+\psi_3)$. The harmonics are added to the inverter output voltage and must be filtered by the high frequency filter 22. In order to reduce the size and weight of the filter 22 it is desirable to reduce the harmonic content of the PWM inverter output voltage.

In accordance with the invention, the controller 30 is operable to modulate the duty cycle command on the line 40 by the third harmonic in order to reduce the effect of the third harmonic to less than one percent.

Figure 3:
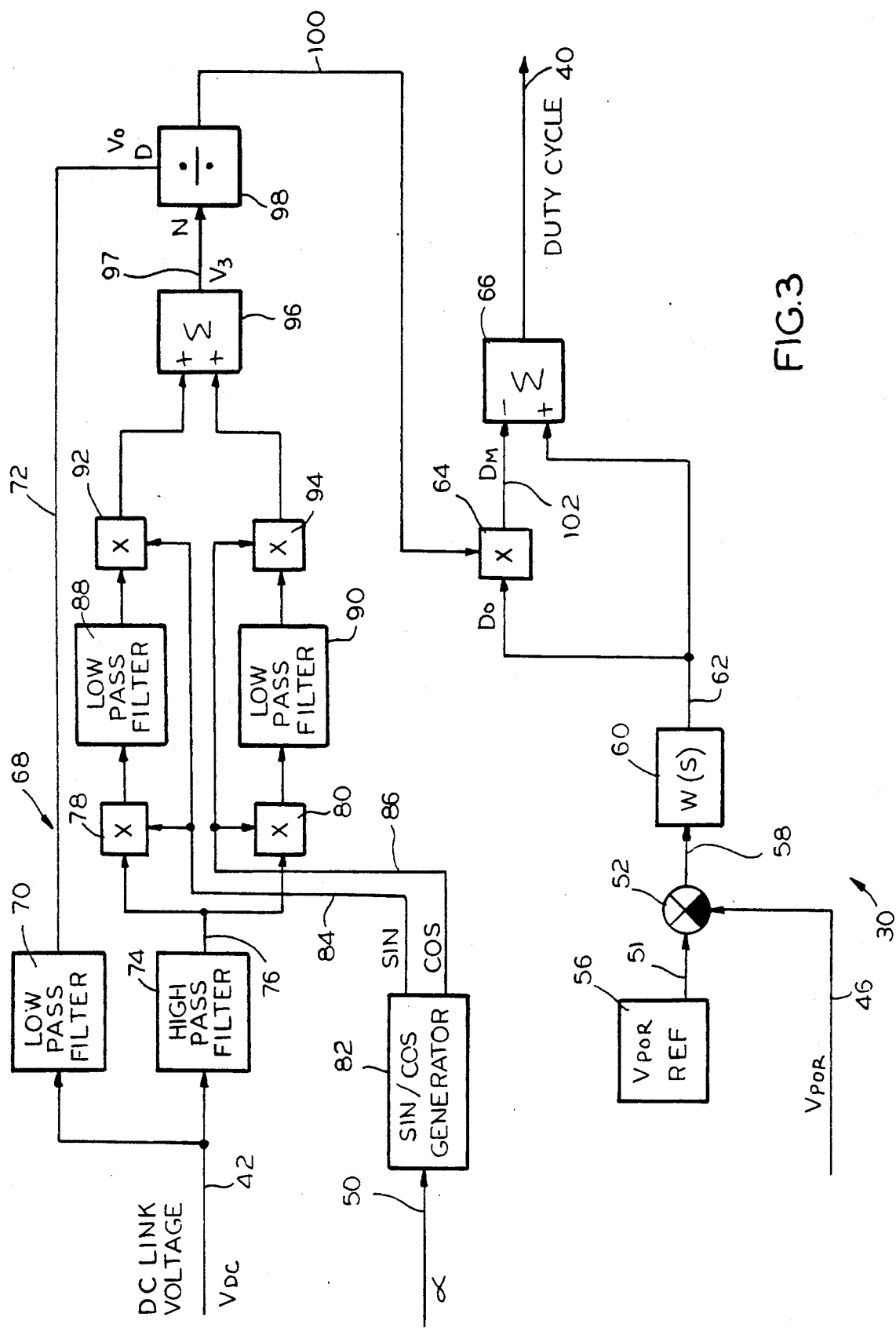
FIG. 3 is a block diagram illustrating the controller of FIG. 1.

With reference to FIG. 3, a block diagram representation illustrates the controller 30 according to the invention.

The signal representing the point of regulation voltage $V_{POR}$ on the line 46 is applied to a first summer 52. The first summer 52 also receives an inverter output reference signal on a line 51 representing a desired inverter output voltage selected at a block 56. The output of the first summer 52 is an inverter output voltage error on a line 58, representing the difference between desired output voltage and actual output voltage, which is applied to a transfer function block 60. The transfer function block 60 compensates the error signal in a conventional manner to provide a duty cycle reference $D_0$ on a line 62. The duty cycle reference represents a duty cycle necessary to maintain the inverter output voltage at the desired level. The duty cycle reference $D_0$ on the line 62 is applied to a first multiplier 64 and to a second summer 66, discussed below. The output of the second summer 66 is the duty cycle command on the line 40 which controls operation of the PWM inverter 38, see FIG. 1. Thus, closed loop control of output voltage is effective to maintain voltage on the AC bus 26 at the select level.

A harmonic sensing control 68 receives the DC link voltage $V_{DC}$ on the line 42 and the phase angle signal on the line 50. The DC link voltage signal on the line 42 is fed through a low pass filter 70 to remove the harmonics and provide a DC level signal $V_0$ on a line 72. The DC link voltage signal on the line 42 is also fed to a high pass filter 74 to remove the DC content and the fundamental frequency. Thus, the output of the high pass filter 74 is a signal on a line 76 which represents the higher order harmonics and, particularly, the third harmonic. The signal on the line 76 is passed to second and third multipliers 78 and 80.

The phase angle signal on the line 50 is applied to a sin/cos generator 82. The sin/cos generator 82 is a lookup table which generates sine and cosine signals corresponding to the third harmonic in accordance with the phase angle signal received on the line 50. Particularly, the generator 82 develops a sine signal on a line 84, represented by the equation $\sin 3\omega t$, and a cosine signal on a line 86, represented by the equation $\cos 3\omega t$. The sine and cosine signals on the lines 84 and 86 are applied to the respective second and third multipliers 78 and 80.

The second and third multipliers 78 and 80 multiply the third harmonic from the high pass filter 74, represented by the equation $V_3\sin(3\omega t+\psi_3)$, by the $\sin 3\omega t$ and $\cos 3\omega t$, respectively. The output of the respective second and third multipliers 78 and 80 are applied to low pass filters 88 and 90 which are in turn coupled to respective fourth and fifth multipliers 92 and 94. The fourth and fifth multipliers 92 and 94 also receive the sine and cosine signals on the lines 84 and 86. The output of the fourth and fifth multipliers 92 and 94 are summed at a summing junction 96 which develops an output $V_3$ on a line 97 representing the third harmonic which is applied as the numerator to a divider 98. The denominator at the divider 98 represents the DC link voltage $V_0$ on the line 72.

The output of the divider block 98 represents the ratio of the magnitude of the third harmonic $V_3$ to the DC link voltage $V_0$ on a line 100 which is applied to the first multiplier 64. The output of the first multiplier 64 is represented by a signal $D_M$, where $D_M = V_3/V_0 \times D_0$, on a line 102 which is passed to the second summer 66. The second summer 66 subtracts the signal $D_M$ on the line 102 from the duty cycle reference $D_0$ on the line 62 to provide a modulated duty cycle reference which comprises the duty cycle command on the line 40.

In operation, the harmonic sensing control 68 is effective in connection with the first multiplier 64 and second summer 66 to modulate the duty cycle determined by the transfer function block 60 by the third harmonic to reduce the effect of the third harmonic from the inverter output voltage.

The controller 30 illustrated and described herein can be implemented with a software programmed microprocessor control unit, or with suitable electrical or electronic circuits, as is obvious to those skilled in the art.

Therefore, in accordance with the invention, a VSCF system is provided with an AC output voltage having reduced harmonic voltage by minimizing the harmonic content in the DC link.

Particularly, the invention broadly comprehends a PWM inverter controlled in accordance with a modulated duty cycle command to provide reduced harmonic content.

We claim:

1. In a control system for an inverter powered by a DC source, the inverter being controlled to provide a select duty cycle to control inverter output voltage, the improvement comprising:
    means for developing a duty cycle command representing a duty cycle necessary to maintain inverter output voltage at a desired level;
    means for sensing harmonic content from said DC source; and
    means coupled with said developing means and said sensing means for modulating said duty cycle command responsive to the harmonic content from the DC source to provide an inverter output voltage having reduced harmonic content.

2. The improvement of claim 1 wherein said developing means comprises a closed loop inverter output voltage control.

3. The improvement of claim 1 wherein said sensing means includes means for sensing voltage from the DC source.

4. In a control system for an inverter powered by a DC source, the inverter being controlled to provide a select duty cycle to control inverter output voltage, the improvement comprising:
    means for developing a duty cycle command representing a select duty cycle for inverter operation;
    means for sensing harmonic content from said DC source, said sensing means including means for sensing voltage from the DC source and means for separating the DC content and harmonic content of the voltage from said DC source; and
    means coupled with said developing means and said sensing means for modulating said duty cycle command to provide an inverter output voltage having reduced harmonic content.

5. The improvement of claim 4 wherein said sensing means includes means for dividing the instantaneous value of the harmonic content from the magnitude of the DC content of the voltage from the DC source.

6. The improvement of claim 1 wherein said duty cycle command is modulated inversely to said harmonic content.

7. In a control system for an inverter coupled to a DC bus, the inverter being controlled in accordance with a duty cycle command to provide a select inverter output voltage, the improvement comprising:
    means for selecting an inverter output reference representing a desired inverter output voltage;
    means for sensing actual inverter output voltage;
    means coupled to said selecting means and said sensing means for determining a duty cycle reference responsive to said desired and said actual inverter output voltage; and
    means operatively associated with said determining means for modulating said duty cycle reference to produce said duty cycle command to provide an inverter output voltage having reduced harmonic content.

8. The control system of claim 7 wherein said determining means comprises a closed loop inverter output voltage control.

9. The control system of claim 7 wherein said modifying means includes means for sensing DC bus voltage.

10. In a control system for an inverter coupled to a DC bus, the inverter being controlled in accordance with a duty cycle command to provide a select inverter output voltage, the improvement comprising:
    means for selecting an inverter output reference representing a desired inverter output voltage;
    means for sensing actual inverter output voltage;
    means coupled to said selecting means and said sensing means for determining a duty cycle reference responsive to said desired and said actual inverter output voltage; and
    means operatively associated with said determining means for modifying said duty cycle reference to produce said duty cycle command to provide an inverter output voltage having reduced harmonic content, said modifying means including means for sensing DC bus voltage and means for separating the DC content and harmonic content of the DC bus voltage.

11. The control system of claim 10 wherein said modifying means includes means for dividing the instantaneous value of the harmonic content from the magnitude of the DC content of said DC bus voltage.

12. The control system of claim 7 wherein said duty cycle reference is modulated inversely to said harmonic content.

13. A control system for an inverter coupled to a power source which provides a DC bus voltage, said DC bus voltage including undesirable harmonics, comprising:
    means for selecting an inverter output reference representing a desired inverter output voltage;
    first sensing means for sensing actual inverter output voltage;
    means coupled to said selecting means and said sensing means for determining a duty cycle reference responsive to said desired and said actual inverter output voltage;
    second sensing means for sensing harmonic content in said DC bus voltage; and
    means coupled with said determining means and said second sensing means for modulating said duty cycle reference to produce said duty cycle command to provide an inverter output voltage having reduced harmonic content.

14. The control system of claim 13 wherein said determining means comprises a closed loop inverter output voltage control.

15. The control system of claim 13 wherein said second sensing means includes means for sensing DC bus voltage.

16. A control system for an inverter coupled to a power source which provides a DC bus voltage, said DC bus voltage including undesirable harmonics, comprising:
    means for selecting an inverter output reference representing a desired inverter output voltage;
    first sensing means for sensing actual inverter output voltage;
    means coupled to said selecting means and said sensing means for determining a duty cycle reference responsive to said desired and said actual inverter output voltage;

second sensing means for sensing harmonic content in said DC bus voltage, said second sensing means including means for sensing DC bus voltage and means for separating the DC content and harmonic content of said DC bus voltage; and means coupled with said determining means and said second sensing means for modifying said duty cycle reference to produce said duty cycle command to provide an inverter output voltage having reduced harmonic content.

17. The control system of claim 16 wherein said second sensing means includes means for dividing the instantaneous value of the harmonic content from the magnitude of the DC content of said DC bus voltage.

18. The control system of claim 13 wherein said duty cycle reference is modulated inversely to said harmonic content.

* * * * *